United States Patent

[11] 3,595,306

[72] Inventors Robert Lewis Bickerdike
  Clays Farm, East Worldham, Alton
  Hampshire;
  John Gwynne Davies, 38 Church Hill
  Crescent Hawley Lane Estate,
  Farnborough; William Norman Mair,
  Fylingdales, Upper Old Park Lane,
  Farnham, Surrey; Allen Benjamin Osborn,
  26 Napoleon Ave., Farnborough, all of,
  England
[21] Appl. No. 844,534
[22] Filed July 24, 1969
[45] Patented July 27, 1971
[32] Priority July 26, 1968
[33] Great Britain
[31] 35,729/68

[54] TEMPERATURE CONTROL DEVICES
  7 Claims, 2 Drawing Figs.

[52] U.S. Cl. .................................................. 165/47,
  165/86
[51] Int. Cl. .................................................. F24h 3/00
[50] Field of Search ................................. 165/89, 86,
  47, 32, 96, 135

Primary Examiner—Charles Sukalo
Attorney—Stevens, Davis, Miller & Mosher

ABSTRACT: A temperature control device for a body comprises a member which includes a tube integral with or in efficient thermal contact with the body, a piston within the tube and means whereby its position therein may be controlled, and means for introducing heat exchange medium into the tube on the side of the piston remote from the body and means for removing it therefrom. Advantageously the heat exchange medium passes through the piston during its circulation and is brought into intimate contact with the wall of the tube. The device described is particularly applicable to bodies the temperature of which has to be controlled during rotation.

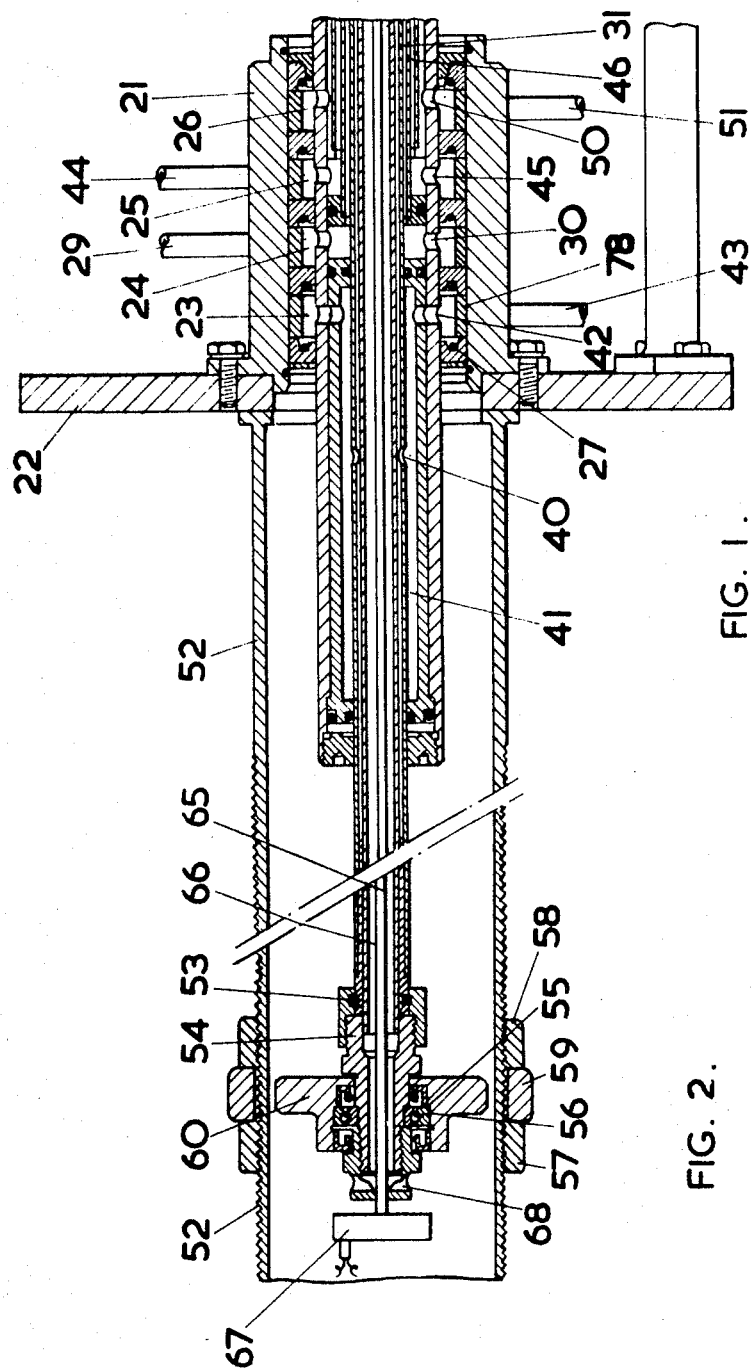

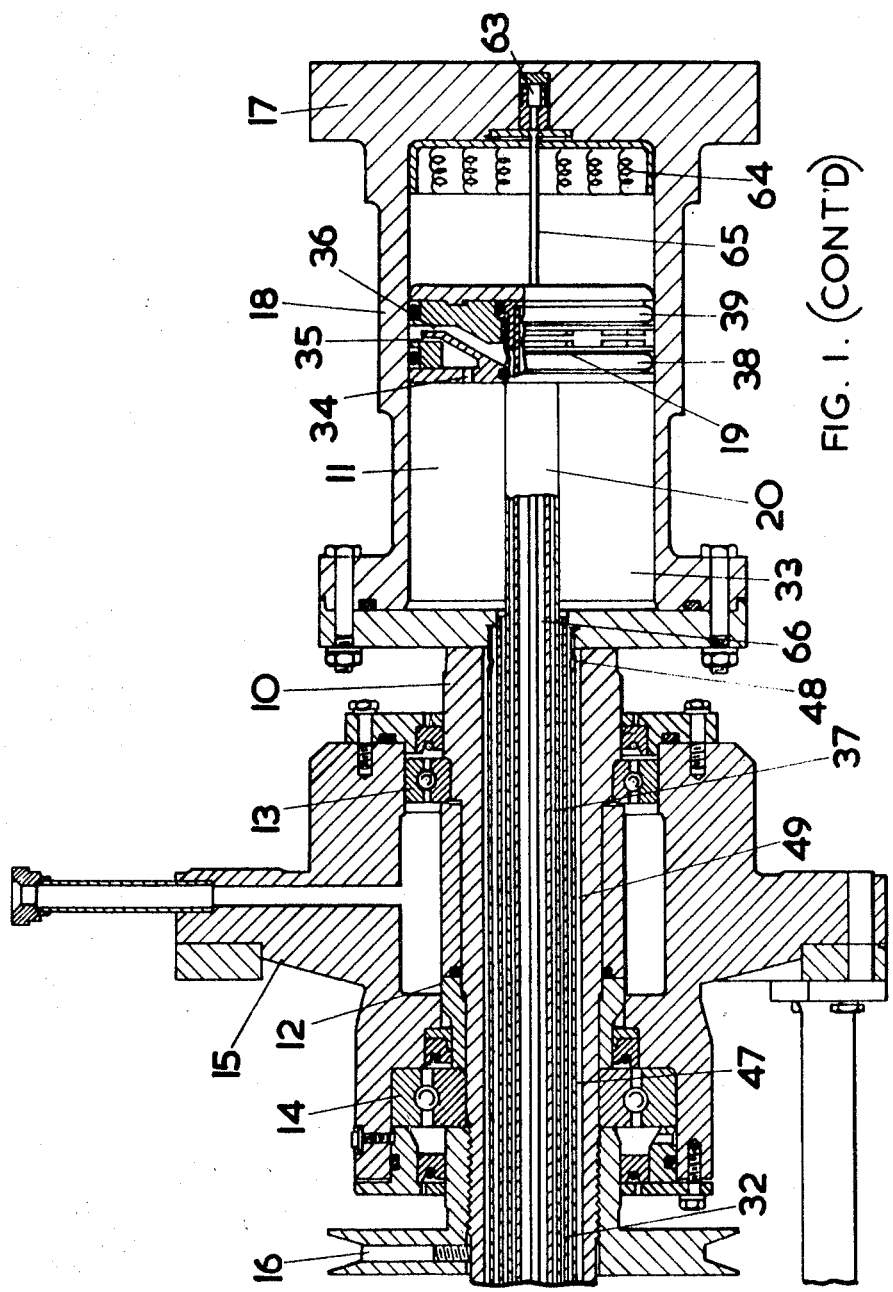

TEMPERATURE CONTROL DEVICES

The present invention relates to temperature control devices.

The control of the temperature of a body is relatively simple unless the body is exposed to unusual conditions; for example if it must be maintained at a relatively low temperature in the vicinity of and when exposed to radiant heating from a high temperature source.

Further complications may be caused by the need to maintain the body at a constant temperature or vary it in a controlled manner while it is being rotated in a vacuum.

In accordance with the present invention a temperature control device for a body comprises a member including a tube integral with or in efficient thermal contact with the body, the temperature of which is sought to be controlled, a piston located within the tube, means for introducing a heat exchange medium into, and extracting said heat exchange medium from the tube on the side of the piston remote from the body, and means for controlling the position of the piston in the tube to vary the amount of the heat exchange medium in contact with the walls of the tube. Preferably the body, the temperature of which is sought to be controlled, and the member are arranged to be capable of rotation.

Advantageously the heat exchange medium is circulated through the piston, in order to cool said piston, and in such a manner that it is brought into intimate contact with the walls of the tube. It is also advantageous for the walls of the tube to be of greater thickness adjacent the said body and of lesser thickness remote therefrom. The tube walls may be tapered or the thickness may decrease by a series of discrete steps.

One embodiment of the present invention will now be described by way of example, with reference to the drawings accompanying the provisional specification in which:

FIG. 1 is a cross section of a major part of the device, and

FIG. 2 is a cross section of the remainder.

FIG. 1 shows a rotatable member 10, which consists of a collector assembly 11 mounted on a first shaft assembly 12, which is arranged to run on two bearings 13 and 14 within a cap 15 capable of being attached to a vacuum vessel (not shown). Also mounted upon the first shaft assembly 12 is a pulley 16 by means of which the rotatable member 10 is driven.

The collector assembly 11 consists of a collector plate 17, which is the temperature controllable body, having attached to it a tube 18 containing a tightly fitting slideable piston 19 mounted upon a second shaft assembly 20 extending into the first shaft assembly 12.

A fixed water housing 21 extends around the first shaft assembly 12 and is attached to a platform 22 through which the shaft extends.

The second shaft assembly 20 protrudes beyond the end of the first shaft assembly 12 and FIG. 2 shows the means by which the second shaft assembly 20 is used to control the position of the piston 19 within the tube 18.

Deionized water, as a heat exchange medium, is circulated through the rotatable member 10 being introduced and removed through the water housing 21 which is divided into an upper exit chamber 23, an upper entry chamber 24, a lower entry chamber 25, and a lower exit chamber 26 by means of Gaco seals 27 and spacers 28. The seals 27 are arranged to permit rotation of the first shaft assembly 12 with respect to the water housing 21 but prevent intermingling of the contents of the various entry and exit chambers 23, 24, 25 and 26.

The main circulation is into the upper entry chamber 24 through a tube 29, through circumferentially disposed holes 30 in the first shaft assembly 12 into an annular space 31 between the outer surface of the second shaft assembly 20 and a first inner tube 32 of the first shaft assembly 12. The water passes down through the annular space 31 and into a space 33 within the tube 18, whence it passes through holes 34 disposed around the shaft into the body of the piston 19. The interior of the body of the piston 19 is arranged so that water entering through the holes 34 at the top is constrained to pass through upper slots 35 to contact the inner wall of the tube 18 before passing through lower slots 36 and passing up an annular space 37 within the second shaft assembly 20.

The piston 19 is provided with two O-ring seals 38 and 39, the lower of which prevents leakage of water into the space between the piston 21 and the collector plate 19.

The water passes up the annular space 37 through circumferentially disposed holes 40 into a further annular space 41 within the first shaft assembly 12, thence through circumferentially disposed holes 42 in the first shaft assembly 12 into the upper exit chamber 23, whence it is discharged through an upper exit pipe 43. This water is recirculated after cooling.

The rotatable member 10 has a subsidiary water circulation by which the bearings 13 and 14 are cooled. Water enters the lower entry chamber 25 through a pipe 44 and passes through circumferentially disposed holes 45 in the first shaft assembly into an annular space 46 between the first inner tube 32 and a second inner tube 47 of the first shaft assembly 12. The water passes down the annular space 46 through circumferentially disposed holes 48 at the bottom of the second inner tube 47 of the first shaft assembly 12 into a further annular space 49 and in passing up that annular space cools the walls of the first shaft assembly 12 after which it leaves the first shaft assembly through circumferentially disposed holes 50 in the first shaft assembly 12 into the lower exit chamber 26 from which it is discharged to waste through a pipe 51.

An externally threaded tube 52 is mounted on the platform 22 and those portions of the first and second shaft assemblies 12 and 20 which extend above the platform 20 protrude into the externally threaded tube 52.

FIG. 2 shows the part of the device not included in FIG. 1 and illustrates the means for controlling the position of the piston 19 within the tube 18. The top of the second shaft assembly 20 has a circumferential notch 53 positively engaged by the lower rim of a head 54 having an upwardly facing flange 55 upon which a bearing 56 runs. The externally threaded tube 52 is engaged by two internally threaded rings 57 and 58 which locate between them an unthreaded loosely fitting ring 59 bolted securely through longitudinal slots (bolts and longitudinal slots not shown) in the externally threaded tube 52 to a carrier 60 in which the bearing 56 is mounted.

As the internally threaded rings 57 and 58 are screwed up and down the externally threaded tube 52 the motion is transmitted to the piston 19 by way of the carrier 60, head 54 and the second shaft assembly 20 so that the movement of the piston 19 within the tube 18 corresponds to the movement of the internally threaded rings 57 and 58.

FIG. 1 also shows a thermocouple 63 by which the temperature of the collector plate 17 is monitored and optionally the collector plate may be provided with a heater 64. A rigid narrow tube 65 extends from the collector plate 17 through a tubular space 66 within the second shaft assembly 20 to the head 54 and carries electrical leads to the thermocouple 63 and the heater 64. The head 54, is provided with a slipring assembly 67 through which electrical connection is made with the thermocouple 63 and the heater 64. The space 66 connects with the atmosphere by way of holes 68 in the head 54 and provides a safety vent if water leaks from the piston 19 when the collector plate 17 is hot enough to evaporate it.

This device may be used as a collector for metals deposited in vacuo from the vapor phase and the temperature of the collector plate 17 may be controlled to within 5° C. even when the collector is exposed to the sudden surge of heat caused by exposure of the metal sources at the beginning of the deposition. For example in a typical run the collector plate was held at 300° C. and then the covers were removed from the heated metal sources, which were held at about 1200° C. but the collector plate temperature rose only to 305° C. and after 5 minutes had returned to 300° C.

When the device is used to collect metals deposited from the vapor phase temperature control is by controlling the rate at which heat is removed. This may be by varying the input temperature of the heat exchange medium or by varying the rate at which the heat exchange medium is circulated, or both, as well as controlling the position of the piston within the tube. The closer the position 19 is to the collector plate 17 the faster heat is carried away and this effect may be amplified by having the walls of the tube 18 thicker at the collector plate 17 and decreasing either stepwise (as shown) or smoothly in a tapered manner away from the collector plate. By this means the rate of removal of heat is made nonlinear with respect to the movement of the piston enabling large temperature variations to be accommodated.

It may be necessary to heat the collector to a temperature above that attainable by exposure to the metal sources, particularly before the covers are removed and an electrical heater may be provided for that purpose. This heater may also be used as a fine control for the temperature of the collector.

The dimensions of the collector may be selected to ensure that the heat flow is optimum for a selected temperature range by use of data known to the art.

We claim:

1. A temperature control device for a body comprising a member including a tube in operative thermal contact with said body, a piston located within said tube, means for introducing a heat exchange medium into the tube on the side of the piston remote from said body and removing said heat exchange medium therefrom, and means to control the position of the piston within the tube.

2. A temperature control device as claimed in claim 1 in which the body, the temperature of which is sought to be controlled and said member are arranged to be capable of rotation.

3. A temperature control service as claimed in claim 1 in which the piston includes channel means circulating said heat exchange medium within said piston, and means bringing said heat exchange medium into intimate contact with the wall of the tube during such circulation.

4. A temperature control device as claimed in claim 1 in which the walls of said tube are of greater thickness adjacent said body and of lesser thickness remote therefrom.

5. A temperature control device as claimed in claim 4 in which the tube walls are tapered.

6. A temperature control device as claimed in claim 4 in which tube walls decrease in thickness by a series of discrete steps.

7. A temperature control device as claimed in claim 3, further comprising means to circulate said heat exchange medium through said piston from the side of said piston remote from said body, and extracting means to thereafter remove said heat exchange medium from said piston.